United States Patent
Montilla Lugo

(10) Patent No.: US 11,750,566 B1
(45) Date of Patent: Sep. 5, 2023

(54) CONFIGURING VIRTUAL COMPUTER SYSTEMS WITH A WEB SERVICE INTERFACE TO PERFORM OPERATIONS IN CRYPTOGRAPHIC DEVICES

(71) Applicant: Amazon Technologies, Inc., Seattle, WA (US)

(72) Inventor: Jose Eduardo Montilla Lugo, Allen, TX (US)

(73) Assignee: Amazon Technologies, Inc., Seattle, WA (US)

(*) Notice: Subject to any disclaimer, the term of this patent is extended or adjusted under 35 U.S.C. 154(b) by 88 days.

(21) Appl. No.: 16/836,559

(22) Filed: Mar. 31, 2020

(51) Int. Cl.
| H04L 9/06 | (2006.01) |
| H04L 9/08 | (2006.01) |
| H04L 9/40 | (2022.01) |
| H04L 67/02 | (2022.01) |
| H04L 9/30 | (2006.01) |
| G06F 8/61 | (2018.01) |

(52) U.S. Cl.
CPC ............ H04L 63/0272 (2013.01); H04L 9/30 (2013.01); H04L 63/029 (2013.01); H04L 63/0428 (2013.01); H04L 67/02 (2013.01); G06F 8/61 (2013.01)

(58) Field of Classification Search
CPC . H04L 63/0272; H04L 67/02; H04L 63/0428; H04L 63/029; H04L 9/30; G06F 8/61
See application file for complete search history.

(56) References Cited

U.S. PATENT DOCUMENTS

| 10,909,250 | B2* | 2/2021 | Rudzitis | H04L 9/083 |
| 2003/0163433 | A1* | 8/2003 | Lam | G06Q 20/027 |
| | | | | 705/71 |
| 2015/0358313 | A1* | 12/2015 | Hussain | H04L 63/0823 |
| | | | | 713/173 |
| 2018/0309735 | A1* | 10/2018 | Barnett | H04L 63/08 |
| 2019/0124084 | A1* | 4/2019 | Pieczul | H04L 63/0435 |
| 2019/0342079 | A1* | 11/2019 | Rudzitis | H04L 9/083 |

OTHER PUBLICATIONS

"Implementing and Using Hardware Security Modules"—Fuel, Palo Alto Networks, Nov. 2, 2018 https://blog.fuelusergroup.org/implementing-and-using-hardware-security-modules (Year: 2018).*
"Differentiating Key Management Systems & Hardware Security Modules"—Fornetix, May 15, 2018 https://www.fornetix.com/articles/hardware-security-modules-and-encryption-key-management/ (Year: 2018).*

* cited by examiner

*Primary Examiner* — Randy A Scott
(74) *Attorney, Agent, or Firm* — Davis Wright Tremaine LLP

(57) ABSTRACT

A customer of a computing resource provider configures a virtual computer system in a virtual private network with a web service application. The web service application comprises a web service interface that executes instructions provided by the customer to cause one or more hardware security modules (HSMs) to perform cryptographic operations on data on behalf of the customer without the need to generate programmatic code.

21 Claims, 10 Drawing Sheets

FIG. 5

| Key Label | Extractable | Persistent | Key Algori... | Key Size |
|---|---|---|---|---|
| Test Extract... | true | true | AES | 128 |
| Test Extract... | true | true | AES | 128 |
| AES-wrappi... | true | true | AES | 256 |
| jose-aes256... | true | true | AES | 256 |
| Created wit... | true | false | AES | 256 |
| Created fro... | false | false | AES | 256 |
| New key | false | false | AES | 256 |
| New key web | false | false | AES | 256 |
| My new key... | false | false | AES | 256 |
| Created wit... | true | true | AES | 256 |

Key Handle: 787,410

Key Label: New key web

Extractable: false    Persistent: false

Key Algorithm: AES    Key Size: 256

Save    Close

CONFIGURING VIRTUAL COMPUTER SYSTEMS WITH A WEB SERVICE INTERFACE TO PERFORM OPERATIONS IN CRYPTOGRAPHIC DEVICES

BACKGROUND

Ensuring the security of data is a complex and resource-consuming endeavor, often utilizing significant effort and resources. While cryptographic techniques and devices develop over time to meet ever-changing demands, the complexity involved increases accordingly. Additionally, protocols designed for the purpose of interacting with cryptographic devices for the purpose of performing cryptographic and related operations, while useful for their specific purposes, can be unfamiliar to those who utilize other tools. An engineer building a web application, for example, may have a basic understanding of cryptographic techniques, but may not be proficient in the tools utilized to interact with cryptographic devices. Moreover, different cryptographic devices may have different interfaces, which introduces additional layers of complexity.

BRIEF DESCRIPTION OF THE DRAWINGS

Various techniques will be described with reference to the drawings, in which:

FIG. 5 illustrates further information of an encryption key using the web service interface in accordance with an embodiment;

DETAILED DESCRIPTION

Figure 1:
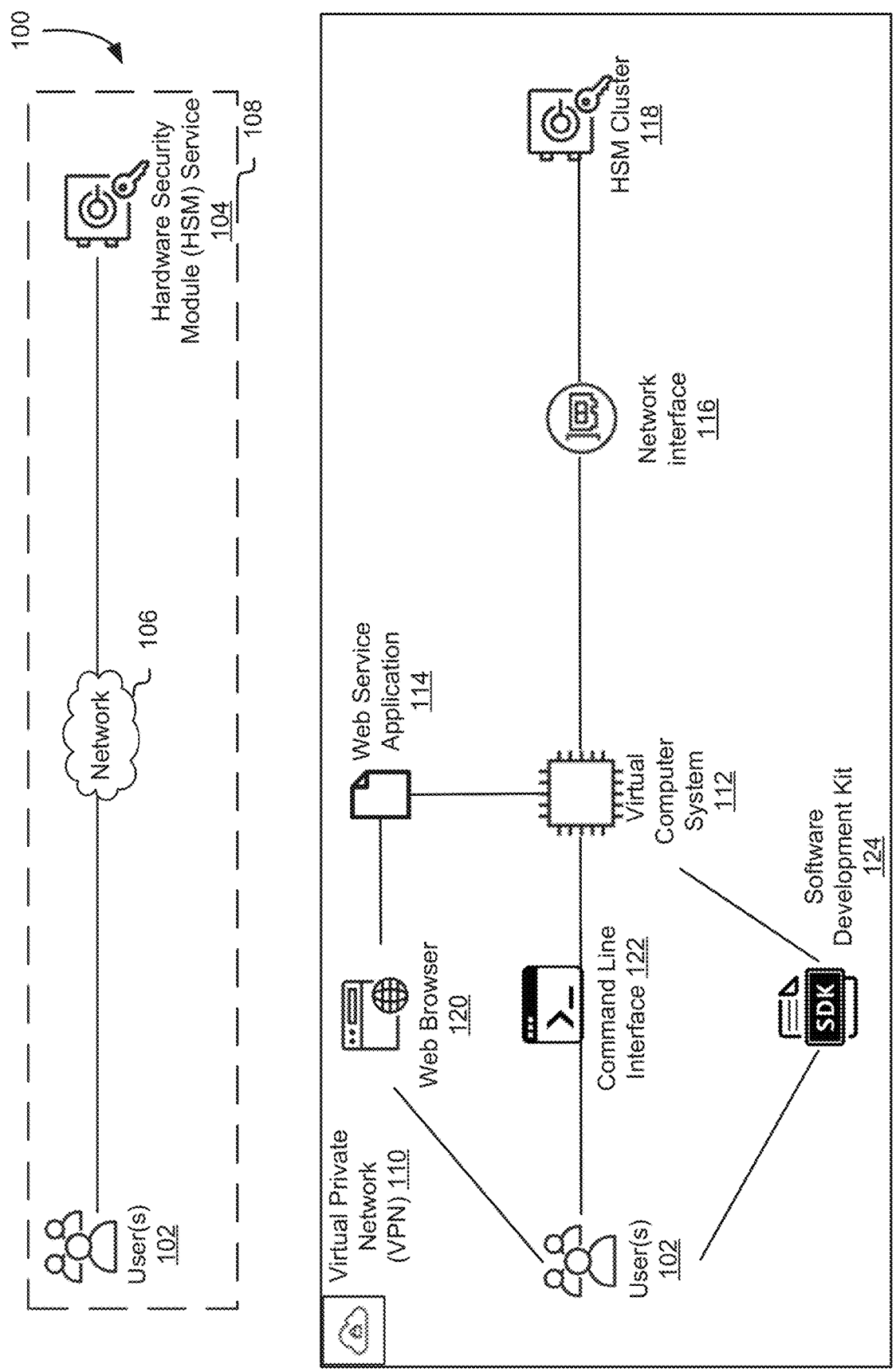
FIG. 1 illustrates an environment in which a customer's virtual private network configures a virtual computer system with a web service application to perform cryptographic operations in accordance with an embodiment.

Techniques described and suggested herein relate to providing additional functionality and enhanced usability for a customer of a computing resource service provider (sometimes referred to as a "cloud provider" or "cloud computing provider") to perform cryptographic operations. In an embodiment, cryptographic operations such as encrypt/decrypt, sign/verify, and import/export keys are made available to a customer in the customer's virtual private network via a web service interface.

In an embodiment, the components to allow a customer to invoke hypertext transfer protocol (HTTP) methods to perform cryptographic operations include at least using a web service interface connected to a web service application, a Command-line interface (CLI), and/or a software development kit (SDK). That is, in an embodiment, the web service interface is connected over the customer's virtual private network to the web service application that is installed on a customer's virtual computer system. The web service interface provides a web interface for the customer to input instructions related to cryptographic operations. As an example, the customer may select a file, using the web interface, to encrypt the file using an encrypt button provided by the interface. Moreover, in some instances, the customer may use the CLI to input cryptographic operation instructions (e.g., commands) that are made available with the execution of the web service application (installed on the virtual computer system) to invoke HTTP methods. Additionally, the customer may be provided an SDK, which is made available over the virtual private network, and that has executable code to invoke the HTTP methods through execution of the web service application installed on the customer's virtual computer system.

In an embodiment, the web service application, when executed on the customer's virtual computer system, allows the customer to use the web service interface to input instructions that cause a hardware security module (HSM) to perform cryptographic operations without the need for the customer to generate programmatic code specific to the HSM. The instructions (e.g., web service requests) may be processed via a gateway service that first authorizes and authenticate the web service request before HSM commands are generated and sent to an HSM to perform cryptographic operations. That is, the web service application is implemented to be executed by the customer's virtual computer system to send HSM commands to the HSM to perform the cryptographic operations. This way, customers in their private virtual network are able to access additional Application Programming Interface functions (sometimes referred to simply as APIs) associated with performing cryptographic operations without having to personally generate or have extensive knowledge on how to generate programmatic code for it.

Typically, APIs that are available for the customer to use only provide operations for the control plane of an HSM service. Operations for the control plane may include creating a cluster of HSMs or creating backup HSMs. On the other hand, cryptographic operations are typically performed from a virtual computer system that has direct connectivity to the HSM service using a CLI tool (e.g., key_mgmt_util) or any of the software libraries (Public Key Cryptography Standards (PKCS), Java, etc.). However, with CLI tools, the operations that are made available are limited such as the unavailability of encryption/decryption commands. Another difficulty is that the use of software libraries sometimes requires customers to have some previous programming experience in order to perform cryptographic operations. Thus, the use of HSM service operations may be difficult, even more so for customers that do not have previous experience operating any HSMs, or that have very limited experience working with cryptography.

Techniques described and suggested herein also provide many technical advantages to effortlessly allow customers to perform cryptographic operations via submitting instructions to an interface executing on their virtual computer system without having to generate or create programmatic code to perform these operations. By installing a web service application on the virtual computer system, a web service interface may be connected over the network and usable by the customer to communicate with HSMs in its private network. Using the web service interface allows customers to access additional APIs. That is, a web application installed on a customer's virtual computer system provides Hypertext Transfer Protocol (HTTP) methods for the customer to perform common cryptographic operations with an easy to use and intuitive web service interface. Additionally, the web service application allows the HSM service to extend to clients beyond the virtual computer system as a simple HTTP customer using cURL would be sufficient to call the additionally accessible APIs. This would thereby eliminate the need to setup certificates (obtained by having to independently verify the security of a HSM), clients, libraries, cryptographic users, etc. In other words, this solution makes the HSM service available to customers beyond the virtual computer system itself by creating a web service application that executes on the virtual computer system to provide HTTP methods to perform cryptographic operations, which is similar to the APIs provided in a Key Management Service (KMS).

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an environment 100 in which a customer's virtual private network 110 configures a virtual computer system 112 with a web service application 114 (sometimes referred herein simply as a web application) to perform cryptographic operations in accordance with an embodiment. A web service interface (not depicted in FIG. 1), as described in more detail below with respect to FIGS. 3-7, may be provided when the web service application 114 is executed on the virtual computer system 112. A virtual computer system 112 is sometimes referred here in as a "virtual instance," "virtual machine instance," "virtual machine," "client instance" or simply an "instance." In an embodiment, user(s) 102 (or referred to sometimes herein as user groups, customers, or clients) of a computing resource service provider environment that are authorized use resources in the environment to perform operations. As an example, user(s) 102 in a computing resource service provider environment may instantiate one or more virtual computer system 112 to communicate with one or more HSMs 118 (also referred to herein as a HSM cluster, a fleet of HSMs, or a cluster of HSMs) to perform cryptographic operations. In an embodiment, a virtual computer system 112 is an emulation of a physical computer system. That is, a virtual computer system 112 is based on computer and provide functionality of a physical computer. Their implementations may involve specialized hardware, software, or a combination.

In an embodiment, user(s) 102 are user accounts configured with administrative permissions so that it can communicate over a network 106 to execute or run a HSM service 104. In an embodiment, the HSM service 104 is a cloud-based HSM that enables user(s) 102 to easily generate and use their own encryption keys. Moreover, the HSM service 104 allows user(s) 102 to manage encryption keys using Federal Information Processing Standard (FIPS) 140-2 Level 3 validated HSMs. Hence, the HSM service 104 may provide the user(s) 102 with an HSM, a fleet or cluster of HSMs 118, which can be placed in the customer's virtual private network (VPN) 110. That is, user(s) 102 may instruct the HSM service 104, via a control plane 108, to perform control plane operations such as creating a single HSM or a cluster of HSMs 118 for a customer's VPN 110. In an embodiment, an API of the control plane 108 is configured to set up an HSM with virtual computer system 112 inside of the customer's VPN 110 so that a web service application 114 may be installed on the virtual computer system 112 to provide a web service data plane API for the HSM. The control plane 108 may be a part of router architecture that is configured to determine what to do with incoming packets (e.g., packets that are directed to setting up the HSM and virtual private computer 112). Some of the functions include participating in routing protocols and how routers communicate with one another. The control plane 108 may further be configured to control how the data plane operates (e.g., how the data packets are processed). An HSM, for example, is a tamper-resistant hardware device that is used to strengthen encryption practices by generating and managing keys, encrypting and decrypting data, and creating and verifying digital signatures. Some HSMs are certified at various FIPS 140-2 Levels and are frequently used to meet regulatory standards for cybersecurity and achieve greater security on customer data. In an embodiment, the installation of the web service application 114 is a control plane operation (e.g., caused by a web service API call).

In an embodiment, a cluster of HSMs 118 is a collection of individual HSMs (i.e., one or more HSMs). In an embodiment, the HSM service 104 synchronizes the HSMs 118 in each cluster so that they function as a logical unit, for example, by each having access to the same cryptographic material so that any HSM in the cluster can perform cryptographic operations using the cryptographic material. In some embodiments, a cluster 118 is created first without any HSMs so an authorized user from user(s) 102 would need to create and add at least one HSM to the cluster 118. Prior to adding the HSM, however, the cluster 118 may need to be activated. The cluster 118 may be activated by receiving login credentials from user(s) 102. When the cluster 118 is activated, the cluster's 118 state changes from initialized to active and user(s) 102 can then manage specific users of the HSM and the use the HSM.

When a cluster of HSMs 118 is created, the HSM service 104 may create a security group for the cluster 118 on the user(s) 102 behalf. This security group controls network access to the HSMs in the cluster 118. It allows inbound connections only from certain virtual computer systems 112 that are in the security group. When a HSM cluster 118 is created, the HSM service 104 creates a security group with a name or identifier for that cluster 118. This security group contains a preconfigured Transmission Control Protocol (TCP) rule that allows inbound and outbound communication within the cluster security group over certain communication ports. This rule allows HSMs in the HSM cluster 118 to communicate with each other. As described herein with respect to FIG. 1, an HSM cluster 118 may include more than a single HSM; however, in some embodiments, HSM cluster 118 may just include a single HSM.

The customer's VPN 110, in some instances, may also be referred to a virtual private cloud (VPC) or a private network. The VPN 110 may be created by an authorized user from user(s) 102. The VPN 110 may be a virtual network that is programmatically controlled by the user(s) 102 (e.g., via a web service API call and/or logging onto and configuring the virtual computer system 112) where the virtual network is hosted on hardware of the computing resource service provider. In some embodiments, within the VPN 110, a private subnet is created where it connects to a zone or an area that comprises HSMs specifically associated with the private subnet. Private subnets are then available across all zones. Even if the HSM service 104 is not supported in a certain zone, the HSM cluster still performs as expected if support is added later. Creating a private subnet in each zone provides the most robust configuration for high availability.

Continuing with FIG. 1, in order to interact with and manage the HSM cluster 118, communications are passed through network interfaces 116 associated with the HSM cluster 118. To communicate with the HSMs in the cluster 118, a virtual computer system 112 in the VPN 110 is configured to connect with the network interfaces 116 of the HSMs in the cluster 118. In an embodiment, the virtual computer system 112 is configured with a web service application 114 to allow customers to perform cryptographic operations via instructions inputted to the web service interface configured with their virtual computer system 112 without having to generate or create programmatic code to perform these operations. That is, the web service application 114 that is installed on the virtual computer system 112 obtains web service API calls to perform cryptographic operations (e.g., encrypt) and translates this to an HSM command. Once the web service application 114 is installed, the web service application 114 then invokes a Public Key Cryptography Standard #11 (PKCS #11) API, which has code to translate PKCS #11 API calls to native HSM commands. In some embodiments, these HSM commands are sent over the network, rather than a Peripheral Component Interconnect Express Bus (PCIe) bus. In some instances, the translation of PKCS #11 API call to native HSM command happens at the HSM side (e.g., after the PKCS #11 API call is obtained at one of the HSMs). In some embodiments, the PKCS #11 is a previously agreed upon standard API for use with the HSM cluster 118. The standard API may provide translations from API calls to native HSM commands which would be consistent with the communication protocols supported by the HSM cluster 118. However, other standards may also be used in lieu of the PKCS #11 standard. After an HSM from the HSM cluster 118 obtains the HSM command, a HSM response is provided. The HSM response is then translated to a web service response using the PKCS #11 before being provided back to the web service application 114. In some embodiments, a standard such as PKCS #11 is unnecessary and the web service application 114 translates the calls directly to native HSM commands, and the translation could occur at the virtual computer system 112 side or after the HSM cluster 118 obtains the calls.

In some embodiments, the web service application 114 is installed by user(s) 102 after the virtual computer system 112 is instantiated. The web service application 114 may be provided as executable code in Java™ that is obtained from an application server (such as from The Apache® Software Foundation) that is outside of the VPN 110. In some instances, the web service application 114 is pre-loaded or automatically loaded onto each and every virtual computer system 112 in the VPN 110 when a virtual computer system 112 is instantiated to communicate with the HSM cluster 118. That is, in an embodiment, the machine image used to instantiate the virtual computer system 112 includes the web service application 114 already as a part of the image so that the web service application 114 does not need to be separately installed.

In some embodiments, user(s) 102 log on to the virtual computer system 112 to use the web service application 114. A web browser, configured to display a web client interface 120, which is connected over the network 110, is further configured to receive instructions/input from user(s) 102. Moreover, a CLI 122 is also built on top of the web service interface that allows invocation of HTTP methods. Furthermore, an SDK 124 may also be made available over the network 110. The SDK 124 may include code that can be run to invoke the HTTP methods. By installing the web service application 114 on the virtual computer system 112, a new set of APIs are made available for the user 102. In other words, the web service application 114 provides Hypertext Transfer Protocol (HTTP) methods for user(s) 102 to perform common cryptographic operations with an easy to use and intuitive web service interface. Moreover, parameters such as the key handle, the cryptographic mode of operation (e.g., Electronic Codebook (ECB), Cipher Block Chaining (CBC), Galois/Counter Mode (GCM), etc.) and the plaintext/ciphertext associated with those modes of operations are passed in JavaScript Object Notation (JSON) format which makes it convenient for user(s) 102 to navigate these services.

Figure 2:
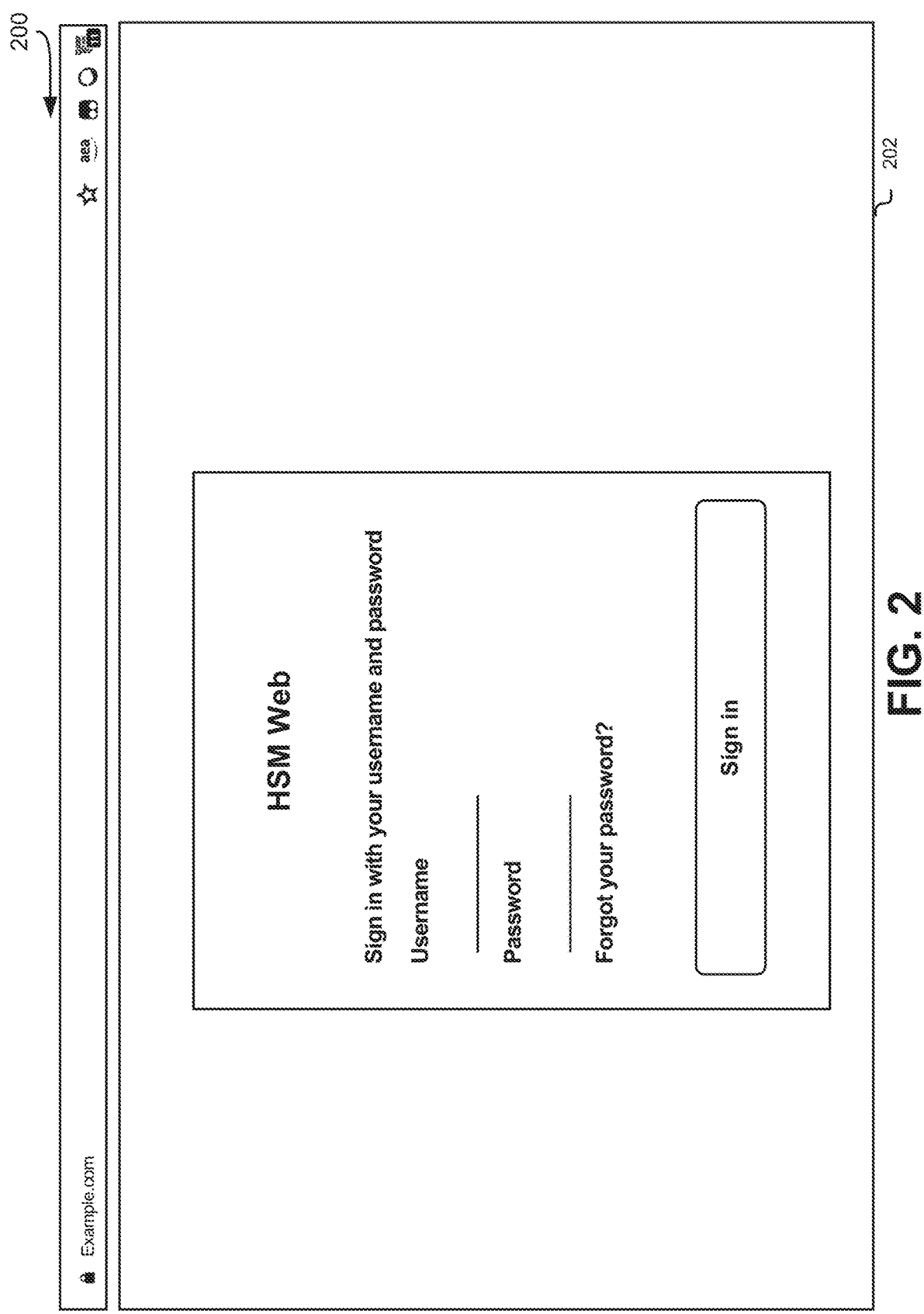
FIG. 2 shows a web service interface associated with executing the web service application on the virtual computer system in accordance with an embodiment.

FIG. 2 shows a web service interface 200 associated with executing the web service application on the virtual computer system in accordance with an embodiment. In an embodiment, user(s) 102, as described with respect to FIG. 1, provide log in credentials to use the virtual computer system 112 to communicate with the HSM cluster 118. The provided log in credentials are then authenticated using a authentication service or authentication server (not depicted in FIG. 2) before access to communicate with the HSM cluster 118 using the virtual computer system 112 is provided. An authentication server may be an application that facilitates authentication of an entity that attempts to access a network, a system, an instance, etc. In some embodiments, web service application 114 is provided when the virtual computer system 112 is instantiated for user(s) 102 without needing additional log in credentials. In some embodiments, the web service application 114 is installed after user(s) 102 gain access to the virtual computer system 112. As mentioned above with respect to FIG. 1, in some embodiments, the web service application 114 is installed manually by user(s) 102. In an embodiment, user(s) 102 select the web service application 114 from an application server (not depicted in FIG. 2). The web service application 114 is then run or executed by the virtual computer system 112.

Figure 3:
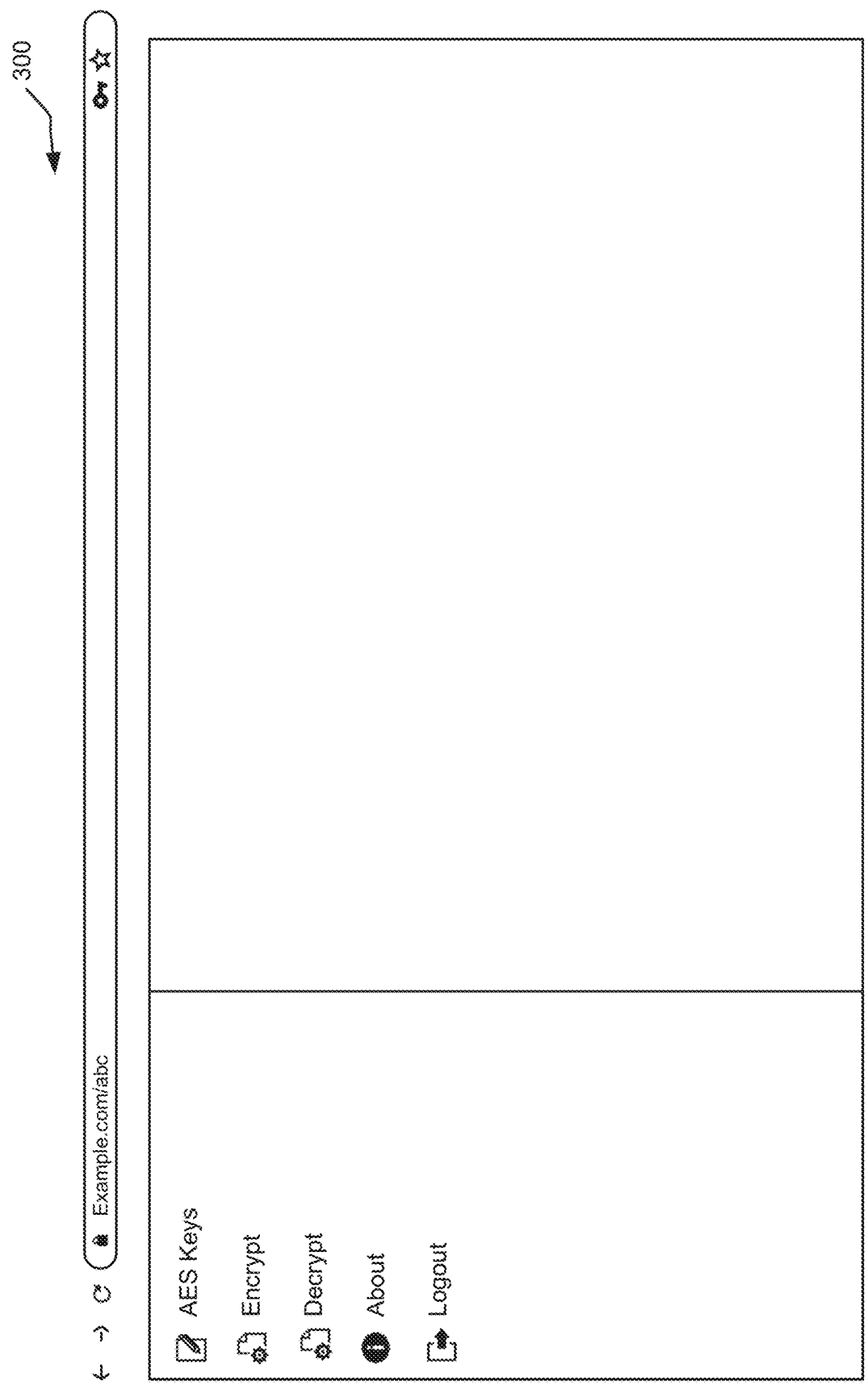
FIG. 3 illustrates a the web service interface in accordance with an embodiment.

FIG. 3 illustrates a web service interface 300 in accordance with an embodiment. The web service interface 300 is a result of executing the web service application 114 on the virtual computer 112. The web service interface 300 is configured with multiple options for user(s) 102 to select. In some embodiments, there are options such as "AES (Advanced Encryption Standard) Keys" (which is, for instance, a listing of the keys), "Encrypt," "Decrypt," "About," and "Logout." In some embodiments, more or less options than those illustrated in FIG. 3 are provided. In some embodiments, the web service interface 300 provides user(s) 102 options so that once selected, user(s) 102 are able to perform cryptographic operations. In some embodiments, these options, when elected, create HSM commands that can be used by the HSM to perform cryptographic operation so long as the HSM commands are supported by the HSM protocol. That is, an option may be configured such that, when the option selected by the customer using the web service interface 300, the web service application identifies which API call to submit to the HSM. In some embodiments, the HSM commands (e.g., API calls) that are available to user(s) 102 includes the following:

listkeys
    Lists all the AES keys available in the HSM service 104 encryptaesecbpkcs5padding
    Encrypts the plaintext using AES in Electronic Codebook (ECB) mode with Public Key Cryptography Standards #5 (PKCS5) padding encryptaescbcpkcs5padding
    Encrypts the plaintext using AES in Cipher Block Chaining (CBC) mode with PKCS5 padding encryptaesgcm
    Encrypts the plaintext using AES in Galois/Counter Mode (GCM) mode with no padding createaeskey
    Creates a 256-bit AES key decryptaesecbpkcs5padding
    Decrypts the ciphertext using AES in ECB mode with PKCS5 padding decryptaescbcpkcs5padding
    Decrypts the ciphertext using AES in CBC mode with PKCS5 padding decryptaesgcm
    Decrypts the ciphertext using AES in GCM mode with no padding Moreover, additional HSM commands (e.g., APIs) such as the following may also be supported via use of the web service application 114:

CancelKeyDeletion— cancels the deletion of a customer master key (CMK)

ConnectCustomKeyStore— connects or reconnects a customer key store to its associated cluster CreateAlias— creates a display name for a customer manager CMK CreateCustomKeyStore— creates a customer key store that is associated with a cluster CreateGrant— adds a grant to a CMK. The grant allows the grantee principal to use the CMK when the conditions specified in the grant are met.

CreateKey— creates a unique customer manager CMK.

Decrypt— decrypts ciphertext that was encrypted by a CMK

DeleteAlias— deletes the specified alias

DeleteCustomKeyStore— deletes the custom key store

DeleteImportedKeyMaterial— deletes key material that was previously imported.

DescribeCustomKeyStores—gets information about custom key stores in the account and region DescribeKey— provides detailed information about a CMK DisableKey— sets the state of a CMK to disabled, thereby preventing its use for cryptographic operations DisableKeyRotation— disables automatic rotation of the key material for the specified symmetric CMK DisconnectCustomKeyStore— disconnects the customer key store from its associated cluster EnableKey— sets the key state of a CMK to enabled EnableKeyRotation— enables automatic rotation of the key material for the specified symmetric CMK Encrypt— encrypts plaintext into ciphertext by using a CMK GenerateDataKey—generates a unique symmetric data key. This operation returns a plaintext copy of the data key and a copy that is encrypted under a CMK that can be specify GenerateDataKeyPair—generates a unique asymmetric data key pair. The GenerateDataKeyPair operation returns a plaintext public key, a plaintext private key, and a copy of the private key that is encrypted under the symmetric CMK that can be specified GenerateDataKeyPairWithoutPlaintext—generates a unique asymmetric data key pair. The GenerateDataKeyPairWithoutPlaintext operation returns a plaintext public key and a copy of the private key that is encrypted under the symmetric CMK that can be specified GenerateDataKeyWithoutPlaintext—generates a unique symmetric data key. This operation returns a data key that is encrypted under a CMK that can be specified GenerateRandom—returns a random byte string that is cryptographically secure GetKeyPolicy—gets a key policy attached to the specified CMK GetKeyRotationStatus—gets a Boolean value that indicates whether automatic rotation of the key material is enabled for the specified CMK GetParametersForImport—returns the items you need to import key material into a symmetric, customer managed CMK GetPublicKey—returns the public key of an asymmetric CMK ImportKeyMaterial—imports key material into an existing symmetric CMK that was created without key material ListAliases—gets a list of aliases in the customer's account and region ListGrants—gets a list of all grants for the specified CMK ListKeyPolicies—gets the names of the key policies that are attached to a CMK ListResourceTags—returns a list of all tags for the specified CMK ListRetirableGrants—returns a list of all grants for which the grant's RetiringPrincipal matches the one specified PutKeyPolicy—attaches a key policy to the specified CMK ReEncrypt—decrypts ciphertext and then re-encrypts it entirely within a key management system RetireGrant—retires a grant RevokeGrant —revokes the specified grant for the specified CMK ScheduleKeyDeletion—schedules the deletion of a CMK. A waiting period, specified in days, may be provided before deletion occurs.

Sign—creates a digital signature for a message or message digest by using the private key in an asymmetric CMK TagResource—adds or edits tags for a CMK UntagResource—removes the specified tags from the specified CMK UpdateAlias—associates an existing alias with a different CMK UpdateCustomKeyStore—changes the properties of a custom key store UpdateKeyDescription—updates the description of a CMK Verify—verifies a digital signature that was generated by the Sign operation In an embodiment, a customer wants to generate a data key to be stored in at least one HSM of HSM cluster 118. The user(s) 102 may submit some type of input (e.g., selecting a button) to the web service interface 300 to generate a data key. The input selected may also be referenced as a web service request submitted by user(s) 102. The web service application may then submit, based on the web service request, a GenerateDataKey API call to a key management system for a data key that is a plaintext copy of the data key. The plaintext key may then be used to encrypt data. In response to the GenerateDataKey API call, the plaintext key may be stored in at least one HSM of the HSM cluster 118.

Figure 4:
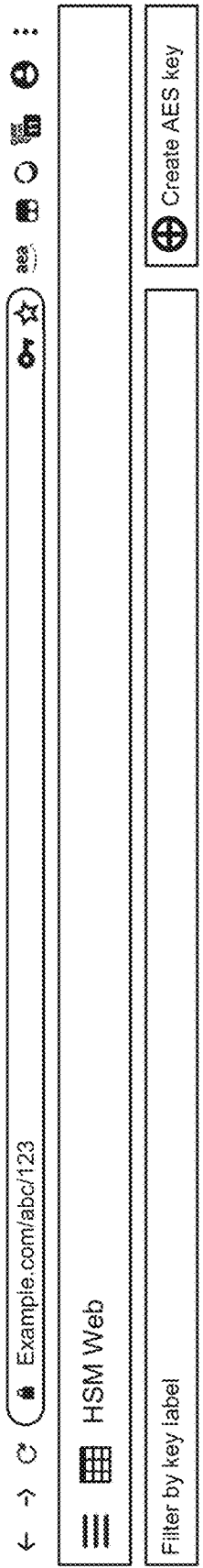
FIG. 4 illustrates a listing of encryption keys using the web service interface in accordance with an embodiment.

FIG. 4 illustrates a listing of encryption keys using the web service interface 400 in accordance with an embodiment. In an embodiment, after user(s) 102 selects the "AES Keys" option on the web service interface 400, the web service interface 400 illustrates all available AES keys where each key is listed based at least in part on and not limited to: the key handle, key label, extractability, persistent, type of key algorithm used, and key size. The web service interface 400 also may present the option for user(s) 102 to filter the keys based on selecting the "Key Label," box and the option for the user to create more AES Keys with the "Create AES key" option. These additional options are just examples provided as illustrated in FIG. 4; however, there could be more or less options configured on the web service interface 400 for a user to navigate through.

The listing of AES keys in FIG. 4 is one example embodiment of the types of keys that are listed. However, the techniques described herein can also be extended to other types of keys using different cryptographic algorithms (including both symmetric and asymmetric algorithms). As discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include not only AES keys, but also keys using the data encryption standard (DES), triple DES (3DES), Serpent, Twofish, blowfish, CAST5, RC4 and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS #1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure and the above is not intended to be an exhaustive list.

FIG. 5 illustrates further information of an encryption key using the web service interface 500 in accordance with an embodiment. After selecting a specific key from the web service interface 400 with respect to the listing of keys in FIG. 4, details of a specific key are illustrated on the web service interface 500 in FIG. 5. The details of the specific key may be provided in a new window separate from the listing of the keys from FIG. 4. However, in some embodiments, the details of the specific key may be provided in the same window from FIG. 4. Changes and edits to the details of the specific key may be made by an authorized user of user(s) 102 and thereby saved.

Figure 6:
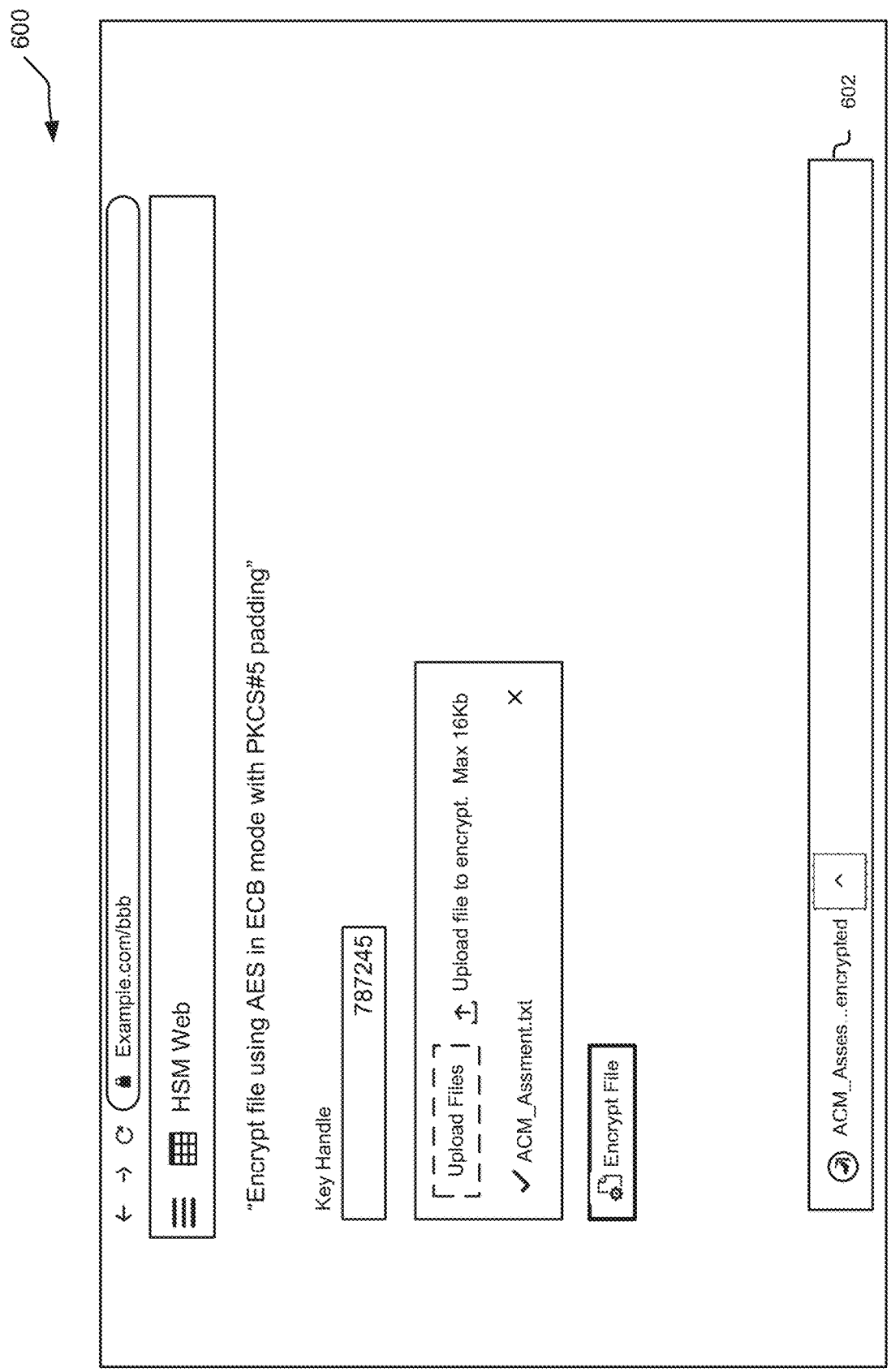
FIG. 6 illustrates a process to encrypt data using one of the encryption keys from the listing of encryption keys using the web service interface in accordance with an embodiment.

FIG. 6 illustrates a process to encrypt data using one of the encryption keys from the listing of encryption keys using the web service interface 600 in accordance with an embodiment. In an embodiment, the web service interface 600 presents the key selected from FIG. 5 and brief information about the key (e.g., key handle). The web service interface 600 then allows a user to select a file, image, video, data, or the like to be encrypted by the selected key. In an embodiment, as illustrated in FIG. 5, key handle "787245" is selected to encrypt "ACM_Assesmment.txt" and this file is encrypted in ECB mode with PKCS #5 padding. In an embodiment, a notification 602 of some sort is provided to indicate that the file has been encrypted. In some embodiments, the encrypted file is stored automatically in a database, data storage device, or a data store in the customer's virtual private network 110. In some embodiments, the encrypted file is stored in a data storage device outside of the virtual private network 110.

Typically, without the execution of a web service application 114 running on a virtual computer system 112, user(s) 102 would have to generate code using Java Cryptography Extension or PKCS #11 in C Programming in the customer's virtual computer system to encrypt a file. However, by installing and/or executing the web service application 114, a web service interface 500, CLI, and/or a SDK may be connected over the customer's private network to invoke HTTP methods, and user(s) 102 may bypass generating or creating code to perform cryptographic operations such as encrypting/decrypting a file by simply interacting with the web service interface 500 and selecting options therein.

Figure 7:
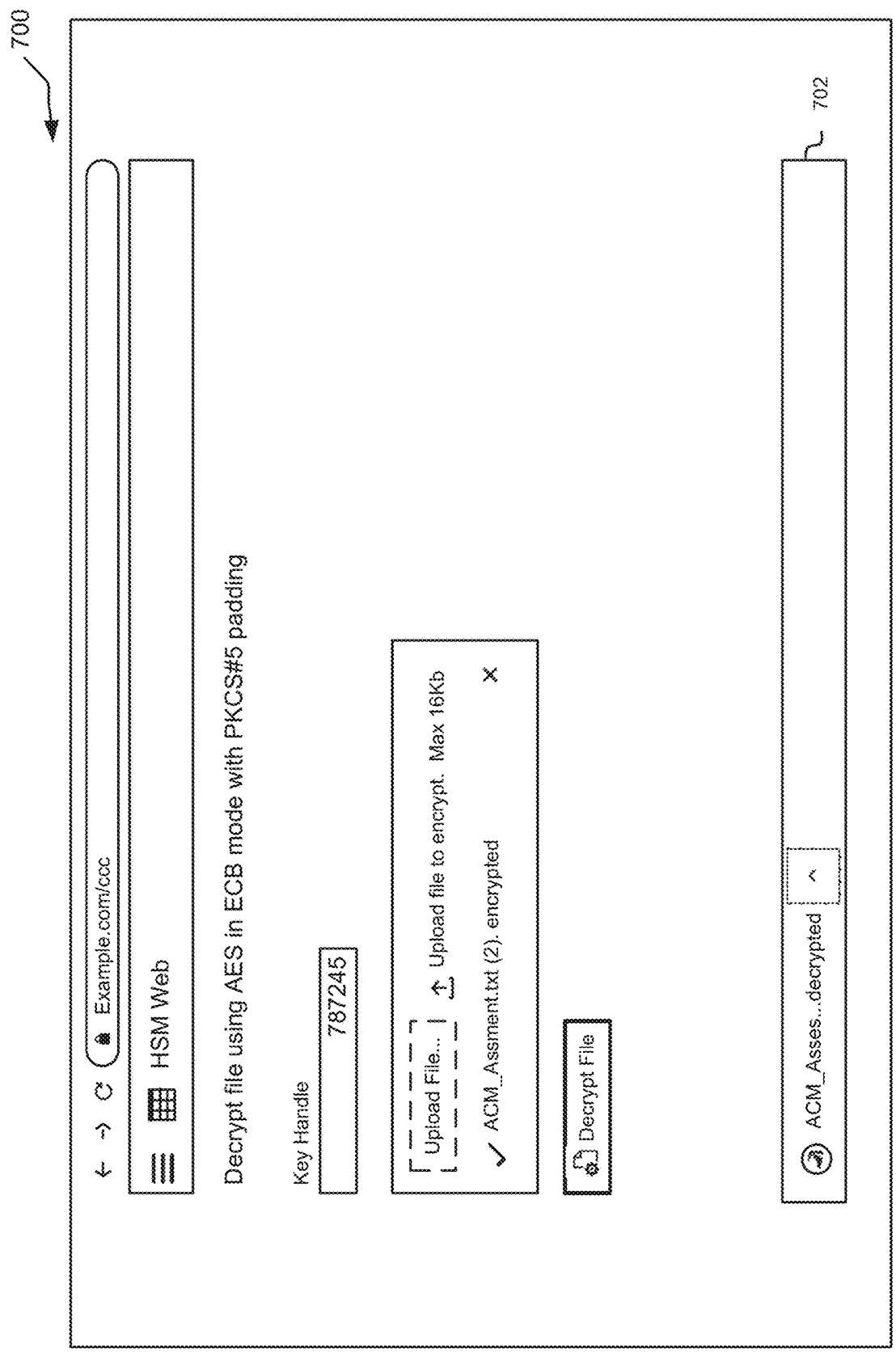
FIG. 7 shows a process to decrypt data using one of the encryption keys from the listing of encryption keys using the web service interface in accordance with an embodiment.

FIG. 7 shows a process to decrypt data using one of the encryption keys from the listing of encryption keys using the web service interface 700 in accordance with an embodiment. In an embodiment, the web service interface 700 illustrates that the file that was previously encrypted in FIG. 6 is decrypted using the same key. As illustrated in FIG. 7, the key handle "787245" is used to decrypt the encrypted "ACM_Assesment.txt" file. Once the decryption occurs, a notification 702 of some sort is provided to indicate that the file has been decrypted. In some embodiments, the decrypted file is stored automatically in a database, data storage device, or a data store in the customer's virtual private network 110. In some embodiments, the decrypted file is stored outside of the virtual private network 110.

Figure 8:
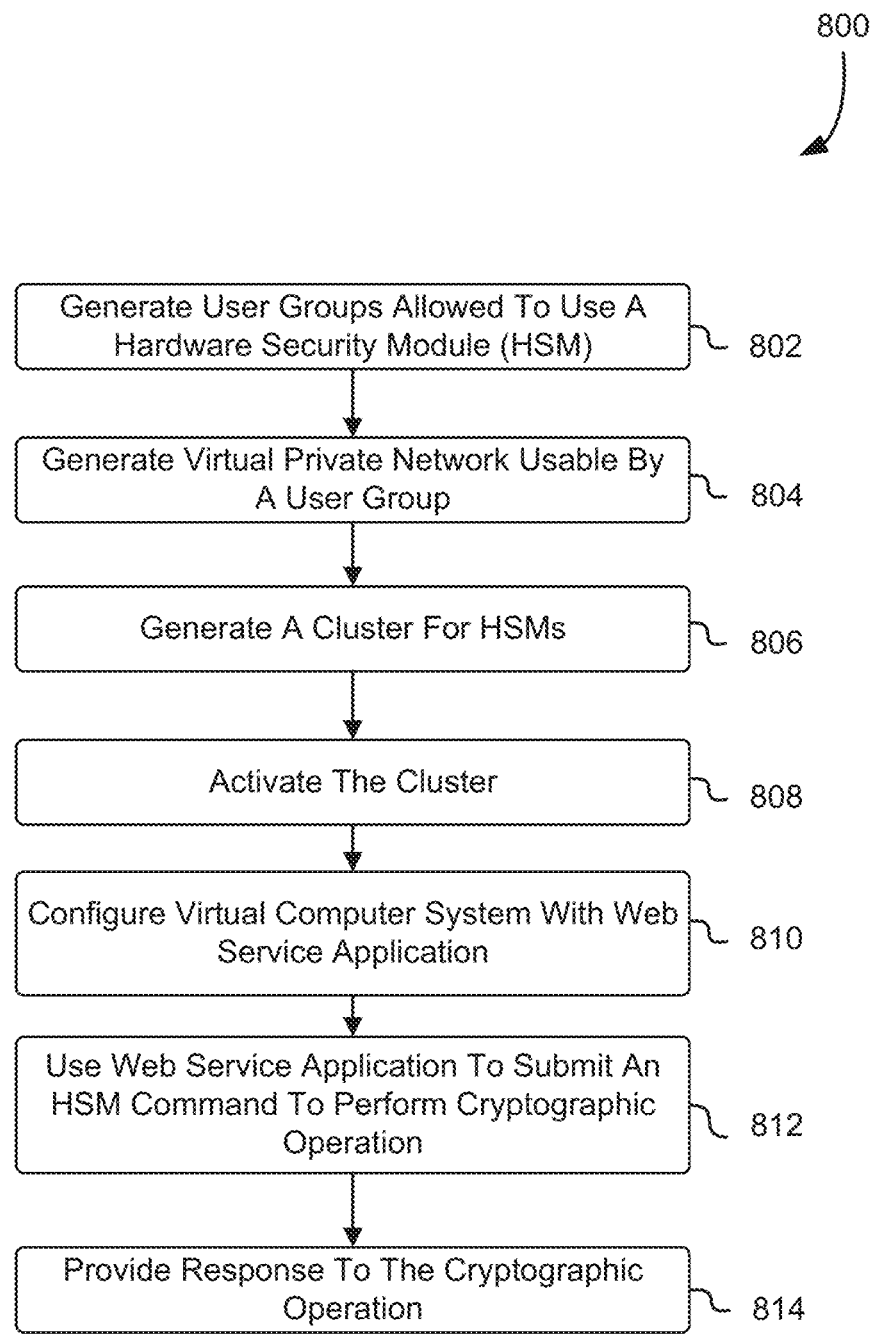
FIG. 8 shows a process using a web service interface with a virtual computer system to perform cryptographic operations in accordance with an embodiment.

FIG. 8 shows a process 800 using a web service interface with a virtual computer system to perform cryptographic operations in accordance with an embodiment. In at least one embodiment, an administrator with authorized permissions generates one or more user groups. A user group may comprise of one or more users that are given authorization to access computing resources (e.g., virtual computer systems, HSMs, data stores, applications, etc.) in a computing resource service provider environment. In some embodiments, as described herein, the one or more users is also referred to as one or more customers. Once a user group is created, the user group may be authorized to use one or more HSMs 802 to perform cryptographic operations. In an embodiment, a HSM service provides the user group with an HSM or a cluster HSMs, which can be placed in the user group's virtual private network (VPN). The VPN may be a private network usable by the user group 804. The VPN may also be referred to as a virtual private cloud (VPC). In some embodiments, at least one user of the user group instructs the HSM service, in a control plane, to perform control plane operations such as creating a cluster of HSMs or simply creating a single HSM and placing it in the customer's VPN. This user may be an authorized user of the user group that has authorization to generate HSMs for the group.

In an embodiment, a cluster of HSMs is a collection of individual HSMs (e.g., one or more HSMs). In an embodiment, the HSM service synchronizes the HSMs in each cluster so that they function as a logical unit. In some embodiments, a cluster is created with at least one HSM 806. The customer may, in the control plane, send an instruction to connect the customer's virtual computer system to the cluster 808. In another embodiment, the cluster is created first without an HSM and then an HSM is added to the cluster at a later time. That is, the customer may cause the virtual computer system to connect with the cluster first and then create HSMs that can be added to the cluster at a later time.

To interact with and manage the cluster, a customer may submit credentials to log on to a virtual computer system (e.g., virtual machine instance), and any communication may pass through the virtual computer system using network interfaces of the HSM cluster. In alternate embodiments, the commands in the control plane are also used to manage HSMs and adding HSMs in the cluster. After the customer's virtual computer system has connected with a cluster and an HSM in the cluster, the customer may submit instructions (e.g., API calls) using a web service application that is configured to run on the virtual computer system to allow customers to perform cryptographic operations 810. A customer may first log on to the virtual computer system to use the web service application. Subsequently, a customer may use a web service interface associated with the web service application to input instructions without having to generate or create programmatic code to perform these cryptographic operations. In some instances, the web service application is manually installed by the customer onto the virtual computer system. The web service application may be run on a platform provided by a third party application server (such as a server from the Apache® Software Foundation). The web service application may then translate the instructions and submit an HSM command to the HSM such that cryptographic operations are performed 812. That is, the web service application provides HTTP methods for the customer to perform common cryptographic operations with an easy to use and intuitive web service interface 814. The web service interface, which may be connected over the network to the web service application, allows invocation of HTTP methods. The web service request may be obtained via a web client interface to invoke at least one of the HTTP methods. Moreover, a command line interface (CLI) that is built on top of the web service interface may be provided that allows invocation of the HTTP methods. Additionally, an SDK may also be made available over the network where the SDK has code that can be run to invoke HTTP methods. As an example, to invoke HTTP methods to perform cryptographic operations, an HSM PCKS11 API may be used with the web service interface built on top of that and further on top of that both the CLI and web client interface for the customer's use.

In response to the HSM command, a response (e.g., web service response) is provided back to the web service application 814. In some embodiments, a plurality of HSM commands are submitted and a plurality of web service responses are provided. In some embodiments, a plurality of HSM commands are submitted and a single web service response is provided. The web service application may display the response on the web service interface.

Figure 9:
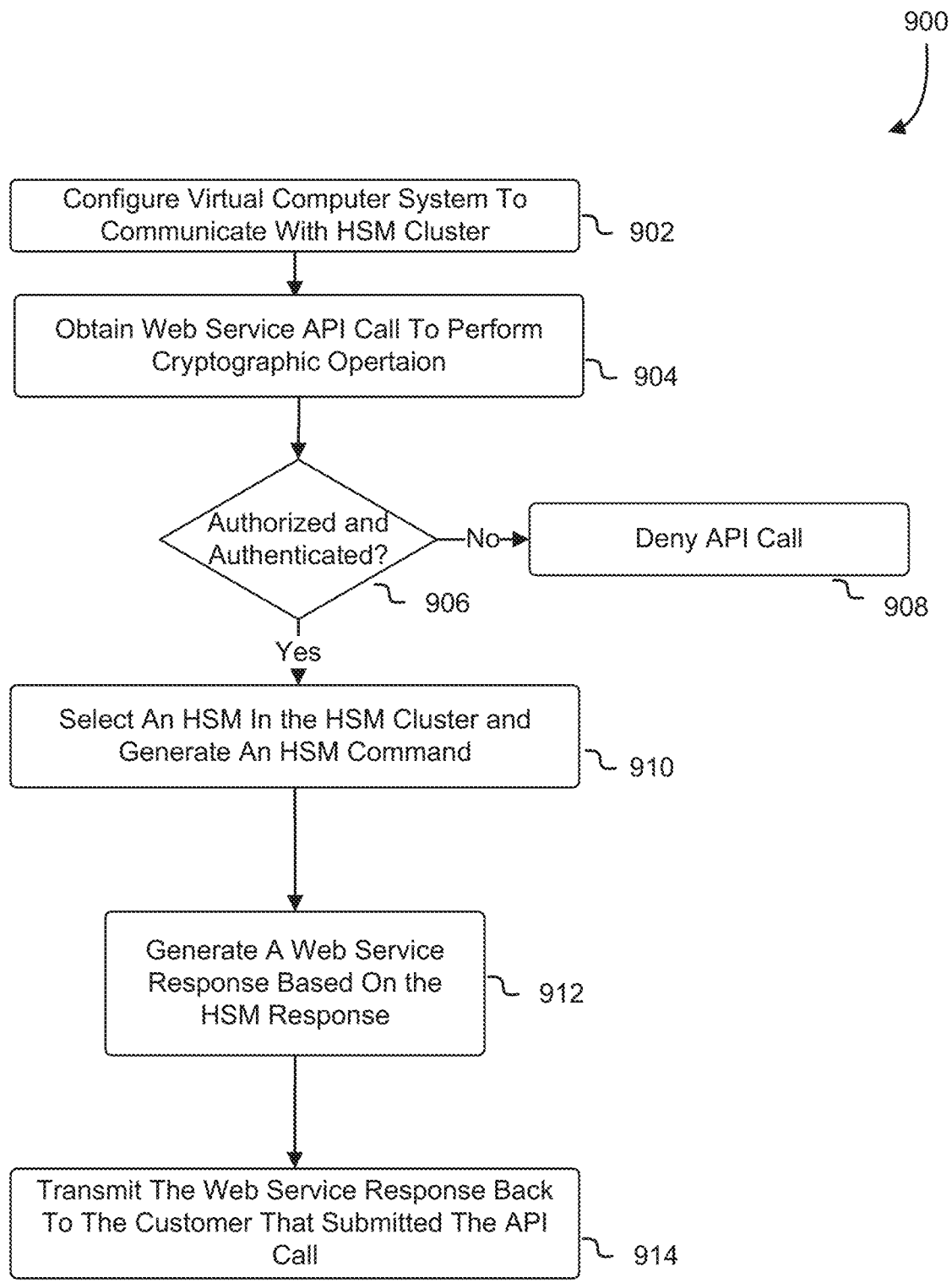
FIG. 9 shows a process to use a virtual computer system to perform cryptographic operations in accordance with an embodiment.

FIG. 9 shows a process 900 to use a virtual computer system to perform cryptographic operations in accordance with an embodiment. In an embodiment, a customer in a virtual private network (VPN) configures a virtual computer system (VCS) to communicate with at least one HSM of a cluster of HSMs 902. The customer performs this by sending an instruction to the computing resource service provider which hosts the resources for the customer. The customer then may generate a web service request (e.g., web service API call), using a web service interface of the VCS, to perform the cryptographic operation 904. A gateway service (sometimes referred herein as an "authentication and authorization service," "request processing service" or "an API gateway service") may then process the web service API call to determine whether the call is authorized and authenticated 906. That is, in some embodiments, the web service request is processed along with a signature first via a gateway service that authorizes and authenticates the request prior to generating HSM commands. In an embodiment, the gateway service makes it easy for developers to create, publish, maintain, monitor, and secure APIs at any scale. The gateway service may support containerized and serverless workloads, as well as web applications. Moreover, an a gateway service handles all the tasks involved in accepting and processing up to hundreds of thousands of concurrent web service requests (e.g., API calls), including traffic management, authorization and access control, throttling, monitoring, and API version management. If the API call is not authorized and authenticated, then the API call is denied 908. If the API call is authorized and authenticated, then an HSM from a cluster of HSMs may be selected 910. In an embodiment, the response from the gateway service may not say whether the request authentic, but an indication that it is authorized would imply it. As an example, the response from the gateway service might send back a general indicator that there are no issues, where the general indicator means all authentication and authorization requirements have been satisfied. In an alternate embodiment, the response from the gateway service could also send back specific responses regarding authentication and authorization being satisfied individually.

The cluster of HSMs may have been previously placed in the customer's VCS for the customer's use to perform cryptographic operations. The VCS then uses the web service API call to generate an HSM command 910. The HSM command may be a command that is configured according to a communication protocol supported by the HSM selected. After receiving the HSM command, the selected HSM then performs the cryptographic operation specified by the API call and a web service response is generated 912. The web service response may be based on the HSM response to the HSM command. The web service response is then transmitted and displayed using the web service interface so that the customer who submitted the API call is made aware of the results of the cryptographic operation 914.

Figure 10:
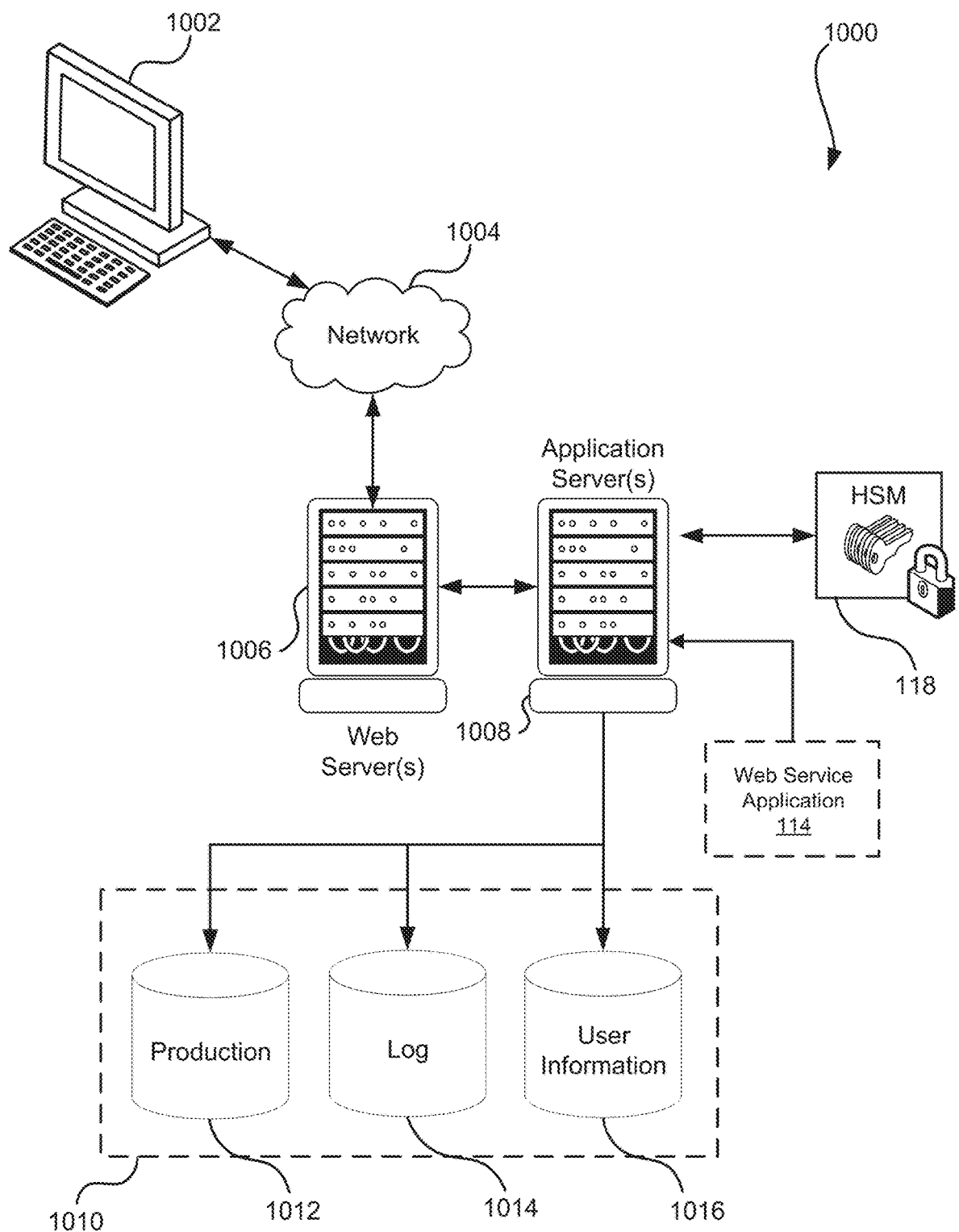
FIG. 10 illustrates an environment in which various embodiments can be implemented.

FIG. 10 illustrates aspects of an example system 1000 for implementing aspects in accordance with an embodiment. As will be appreciated, although a web-based system is used for purposes of explanation, different systems may be used, as appropriate, to implement various embodiments. In an embodiment, the system includes an electronic client device 1002, which includes any appropriate device operable to send and/or receive requests, messages, or information over an appropriate network 1004 and convey information back to a user of the device. Examples of such client devices include personal computers, cellular, or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network, or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1006 for receiving requests and serving content in response thereto, although for other networks an alternative device serving a similar purpose could be used as would be apparent to one of ordinary skill in the art. In an embodiment, communication over the network includes transmitting hardware security module commands from a virtual computer system configured with a web service application 114 to at least one hardware security module from the cluster of hardware security modules 118. In an embodiment, the application server 1008 comprises one or more hardware security modules (HSMs) 118 that store one or more encryption keys for a customer. The one or more encryption keys may be used to perform cryptographic operations in response to hardware security module commands generated by the virtual computer system based on input from the customer.

In an embodiment, the illustrative system includes at least one application server 1008 and a data store 1010, and it should be understood that there can be several application servers, layers, or other elements, processes, or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered system. Data stores, in an embodiment, communicate with block-level and/or object-level interfaces. The application server can include any appropriate hardware, software, and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video, and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually, and/or through other senses. The handling of all requests and responses, as well as the delivery of content between the client device 1002 and the application server 1008, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1010, in an embodiment, includes several separate data tables, databases, data documents, dynamic data storage schemes, and/or other data storage mechanisms and media for storing data relating to a particular aspect of the present disclosure. In an embodiment, the data store illustrated includes mechanisms for storing production data 1012 and user information 1016, which are used to serve content for the production side. The data store also is shown to include a mechanism for storing log data 1014, which is used, in an embodiment, for reporting, computing resource management, analysis, or other such purposes. In an embodiment, other aspects such as page image information and access rights information (e.g., access control policies or other encodings of permissions) are stored in the data store in any of the above listed mechanisms as appropriate or in additional mechanisms in the data store 1010.

The data store 1010, in an embodiment, is operable, through logic associated therewith, to receive instructions from the application server 1008 and obtain, update, or otherwise process data in response thereto, and the application server 1008 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1002. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1000 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 1000, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices, or processing devices that can be used to operate any of a number of applications. In an embodiment, user or client devices include any of a number of computers, such as desktop, laptop, or tablet computers running a standard operating system, as well as cellular (mobile), wireless, and handheld devices running mobile software and capable of supporting a number of networking and messaging protocols, and such a system also includes a number of workstations running any of a variety of commercially-available operating systems and other known applications for purposes such as development and database management. In an embodiment, these devices also include other electronic devices, such as dummy terminals, thin-clients, gaming systems, and other devices capable of communicating via a network, and virtual devices such as virtual machines, hypervisors, software containers utilizing operating-system level virtualization, and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C #, or C++, or any scripting language, such as Ruby, PHP, Perl, Python, or TCL, as well as combinations thereof. In an embodiment, the one or more servers also include database servers, including without limitation those commercially-available from Oracle®, Microsoft®, Sybase®, and IBM®, as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing," are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
    placing a hardware security module cluster in a virtual private network of a customer of a computing resource service provider, the virtual private network implemented using a physical network of the computing resource service provider and programmatically managed by the customer; and
    configuring a virtual computer system inside of the virtual private network to execute a web service application and implement a web service interface to cause the hardware security module cluster to perform cryptographic operations, wherein the web service interface is implemented as executable instructions that, when executed by the virtual computer system, cause the virtual computer system to:
        obtain, over the virtual private network, a web service request generated by an input operation using the web service interface to perform a cryptographic operation, the web service request specifying the cryptographic operation to be performed;
        generate, in response to the web service request, a hardware security module command to cause a hardware security module from the hardware security module cluster to perform the cryptographic operation, the hardware security module command configured according to a communication protocol supported by the hardware security module cluster;
        transmit the hardware security module command to the hardware security module cluster over the virtual private network to obtain a result of performance of the cryptographic operation from the hardware security module cluster over the virtual private network;
        generate, in response to the result, a web service response to the web service request; and
        transmit the web service response in response to the web service request to the web service application.

2. The computer-implemented method of claim 1, wherein the web service interface allows invocation of hypertext transfer protocol (HTTP) methods and wherein the web service request is obtained via a web client interface to invoke at least one of the HTTP methods.

3. The computer-implemented method of claim 2, further comprising providing a command line interface (CLI) that allows invocation of the HTTP methods.

4. The computer-implemented method of claim 1, further comprising using a gateway service to authenticate the web service request and determine whether fulfillment of the web service request is authorized.

5. The method of claim 1, further comprising generating the web service request based, at least in part, on the input operation selecting a cryptographic operation to be performed.

6. A system, comprising:
    one or more processors; and
    memory that stores computer-executable instructions that are executable by the one or more processors to cause the system to:
        associate a web service interface for a virtual computer system inside of a private network comprising a hardware security module, wherein the web service interface is implemented as executable instructions that, when executed by a web service application of the virtual computer system, cause the virtual computer system to submit hardware security module commands to cause the hardware security module to perform a cryptographic operation;
        generate, in response to a web service request generated by an input instruction at the web service interface executed by the virtual computer system, a hardware security module command to cause the hardware security module to perform the cryptographic operation;
        obtain a result of performance of the cryptographic operation from the hardware security module over the private network;
        generate, in response to the result, a web service response to the web service request; and
        provide, using the web service interface, the web service response to the web service application.

7. The system of claim 6, wherein the computer-executable instructions that are executable by the one or more processors, further cause the system to cause the web service interface to allow invocation of hypertext transfer protocol (HTTP) methods and wherein the web service request is obtained via a web client interface to invoke at least one of the HTTP methods.

8. The system of claim 7, wherein the computer-executable instructions that are executable by the one or more processors, further cause the system to provide a command line interface (CLI) that allows invocation of the HTTP methods.

9. The system of claim 6, wherein the web service request is incompatible with any communication protocol supported by the hardware security module; and wherein the hardware security module command is configured according to a communication protocol supported by the hardware security module.

10. The system of claim 9, wherein the web service request specifies the cryptographic operation to be performed.

11. The system of claim 6, wherein the computer-executable instructions that are executable by the one or more processors, further cause the system to use a gateway service to authenticate the web service request and determine whether fulfillment of the web service request is authorized prior to generating the web service response.

12. The system of claim 6, wherein the computer-executable instructions that are executable by the one or more processors, further cause the system to implement a control plane to, in response to application programming interface requests:

create a cluster of hardware security modules; and place the cluster in the private network of a customer.

13. The system of claim 12, wherein the computer-executable instructions that are executable by the one or more processors, further cause the system to use the control plane to install a web service application comprising the web service interface for execution on the virtual computer system.

14. A system, comprising:

a hardware security module (HSM);

a first computer system on a private network to transmit, over the private network, a web service request to perform a cryptographic operation specified by the web service request; and a second computer system comprising:

an HSM interface to transmit HSM commands to the HSM to cause the HSM to perform cryptographic operations; and a web service application to be executed to provide a web service interface comprising a network address on the private network, the web service interface, when executed by the second computer system, cause the second computer system to:

obtain, over the private network, the web service request generated by an input command at the web service interface to perform a cryptographic operation, the web service request specifying the cryptographic operation to be performed;

cause the HSM interface to transmit, in response to the web service request, a respective HSM command to the HSM to cause the HSM to perform the cryptographic operation, the HSM command configured according to a communication protocol supported by the HSM; and transmit, over the private network, a web service response to the web service application.

15. The system of claim 14, wherein the web service interface allows invocation of hypertext transfer protocol (HTTP) methods.

16. The system of claim 15, wherein a command line interface (CLI) is provided that allows invocation of the HTTP methods.

17. The system of claim 14, further comprising:

transmit the web service request and a signature to a request processing service; and obtain a response from the request processing service indicating whether the web service request has been authenticated and whether fulfillment of the web service request is authorized.

18. The system of claim 14, wherein the web service request is incompatible with any communication protocol supported by the HSM.

19. The system of claim 14, further comprising:

translate the web service request to a HSM command compatible with a communication protocol supported by the HSM, at the first computer system, using a public key cryptographic service #11 (PKCS #11) interface.

20. The system of claim 14, further comprising:

install the web service application on the second computer system, wherein the web service application, when implemented on the second computer system, comprises providing the web service interface for use.

21. The system of claim 14, further comprising:

provide, over the private network, the web service response to the web service interface to indicate whether the cryptographic operation was performed successfully.

* * * * *